US011896550B2

(12) United States Patent
Darst et al.

(10) Patent No.: US 11,896,550 B2
(45) Date of Patent: Feb. 13, 2024

(54) PILL CONTAINER AND METHODS

(71) Applicant: Apothecary Products, LLC, Burnsville, MN (US)

(72) Inventors: Daniel Darst, Zimmerman, MN (US); Randall Wayne Nichols, Watertown, MN (US); Betsy Marie Brown, Burnsville, MN (US); Satu Pauliina Lee, Greenfield, MN (US)

(73) Assignee: Apothecary Products, LLC, Burnsville, MN (US)

( * ) Notice: Subject to any disclaimer, the term of this patent is extended or adjusted under 35 U.S.C. 154(b) by 47 days.

(21) Appl. No.: 17/459,488

(22) Filed: Aug. 27, 2021

(65) Prior Publication Data

US 2022/0079841 A1 Mar. 17, 2022

Related U.S. Application Data

(60) Provisional application No. 63/077,183, filed on Sep. 11, 2020.

(51) Int. Cl.
*A61J 1/03* (2023.01)

(52) U.S. Cl.
CPC .................................... *A61J 1/03* (2013.01)

(58) Field of Classification Search
CPC .... A61J 1/03; A61J 7/04; A61J 7/0084; A61J 1/1425; A61J 2200/30; A61J 7/00; A61J 7/0007; A61J 7/0069; B65D 83/0445; B65D 2585/56; B65D 43/267; B65D 43/16; B65D 43/162; B65D 25/04; B65D 50/045; B65D 83/04; B65D 43/164; B65D 43/22
USPC ............... 206/538, 528, 534, 533, 561, 570; D3/203.3; 220/4.23, 23.2
See application file for complete search history.

(56) References Cited

U.S. PATENT DOCUMENTS

| | | | | |
|---|---|---|---|---|
| 4,372,445 | A | 2/1983 | Keffeler | |
| 4,793,492 | A | 12/1988 | Halbich | |
| 7,624,890 | B2 | 12/2009 | Noble et al. | |
| 7,793,785 | B2 | 9/2010 | Keffeler et al. | |
| 7,798,330 | B2 | 9/2010 | Noble et al. | |
| 8,146,627 | B2 | 4/2012 | Mazur | |
| 8,381,911 | B2 * | 2/2013 | Buchner | B65D 83/04 206/530 |
| 9,066,849 | B2 | 6/2015 | Fung et al. | |
| 10,420,703 | B1 * | 9/2019 | Lee | A61J 1/03 |
| 11,440,714 | B2 * | 9/2022 | Wang | B65D 55/02 |
| 2005/0067452 | A1 * | 3/2005 | Darst | A61J 7/0007 225/105 |
| 2007/0062964 | A1 * | 3/2007 | Kampf | B65F 1/1623 220/4.23 |
| 2007/0228047 | A1 * | 10/2007 | Pehr | B65D 83/0445 220/524 |

(Continued)

OTHER PUBLICATIONS

1 International Search Report and Written Opinion for PCT/US2021/048063 dated Jan. 4, 2022, 14pgs.

*Primary Examiner* — Steven A. Reynolds
*Assistant Examiner* — Prince Pal
(74) *Attorney, Agent, or Firm* — Merchant & Gould P.C.

(57) ABSTRACT

A pill container includes a base with a cavity and a lid movable between a closed position and an open position. The base has an integral spring tab such that when the lid is unlocked from the base, the spring tab pushes against an interior part of the lid to move the lid from the closed position to the open position.

12 Claims, 11 Drawing Sheets

(56) References Cited

U.S. PATENT DOCUMENTS

| | | | | |
|---|---|---|---|---|
| 2009/0114562 | A1* | 5/2009 | Noble | A61J 7/04<br>206/538 |
| 2015/0209226 | A1* | 7/2015 | Priebe | A61J 7/0084<br>206/538 |
| 2017/0107022 | A1* | 4/2017 | Lee | B65D 83/0445 |
| 2021/0177698 | A1* | 6/2021 | Lee | A61J 7/0069 |
| 2021/0283014 | A1* | 9/2021 | Guo | B65D 43/26 |
| 2021/0283018 | A1* | 9/2021 | Guo | A61J 7/0084 |
| 2022/0112010 | A1* | 4/2022 | Darst | B65D 50/045 |
| 2022/0153491 | A1* | 5/2022 | Wang | A61J 1/03 |

* cited by examiner

PILL CONTAINER AND METHODS

CROSS-REFERENCE TO RELATED APPLICATION

This application claims the benefit of U.S. Provisional Patent Application Ser. No. 63/077,183, filed Sep. 11, 2020, which is incorporated herein by reference in its entirety.

TECHNICAL FIELD

This disclosure relates generally to containers with hinged mating lids, often used for holding medicine, such as pills. In particular, this disclosure relates to a container having features that result in the lid springing open, as desired.

BACKGROUND

Containers with hinged mating lids are well known. Some containers can include multiple compartments. See, for example, commonly assigned U.S. Pat. No. 7,624,890, incorporated herein by reference.

In some implementations, a conventional pill container results in the lids being deformed and bent, when the lids are in a closed position. U.S. Pat. No. 10,420,703, incorporated herein by reference, proposes a solution to this problem by using a resilient pushing bar to help open the container and move the lid to the open position. This proposal, has short cummings. Improvements are desirable.

SUMMARY

In general, this disclosure is directed to a container that is an improvement over the prior art.

A container is provided comprising: a base having surrounding wall defining a cavity with an interior volume; the cavity including a front portion, a back portion, a bottom, and an open mouth opposite of the bottom; the open mouth providing access to the interior volume of the cavity; the base having a molded in, integral spring tab projecting from an exterior of the back portion; a lid being sized to removably cover the cavity over the mouth so that the lid is movable between a closed position covering the cavity and an open position exposing the cavity; the lid having an interior surface facing the cavity; the lid being pivotably secured to the back portion of the base; the spring tab being in pushing engagement against the interior surface of the lid, when the lid is in the closed position; and the lid having a first member of a hook and catch arrangement to selectively lock the lid to the base, when the lid is in the closed position, and selectively unlock the lid from the base; and a push button assembly connected to the base having a second member of the hook and catch arrangement to selectively lock the lid to the base, when the lid is in the closed position, and selectively unlock the lid from the base; wherein when the lid is unlocked from the base, the spring tab pushes against the interior surface of the lid to move the lid from the closed position to the open position.

The push button assembly is preferably positioned along the front portion of the base.

Preferably, the push button assembly is integral with the base.

In some arrangements, the push button assembly comprises: a button sized for engagement of a human finger; a hinge arrangement joining the button to the base to provide a pivotable attachment of the button to the base; and the second member of the hook and catch arrangement projecting from the button, between the button and the base.

Preferably, the first member of the hook and catch arrangement is a catch projecting from a free end of the lid; and the second member of the hook and catch arrangement is a hook projecting from the button toward the base.

In example embodiments, the spring tab has a free end extending above the mouth of the cavity.

In many examples, the surrounding wall comprises a front wall, opposite back wall, and first and second opposing sidewalls extending between the front wall and back wall; the front wall defining the front portion of the cavity; the back wall defining the back portion of the cavity.

The spring tab can include an arm arrangement securing the tab to the base and positioning the tab to be laterally spaced from the back wall.

In preferred implementations, the base, spring tab, and arm arrangement are a single molded material.

Preferably, the base, spring tab, arm arrangement, and push button assembly are a single molded material.

In many examples, the lid is concave along the interior surface.

In another aspect, a method of opening a container from a closed position is provided. The method comprising: pushing a button to unlock a lid from a base and allowing a spring tab to push against an interior surface of the lid to move the lid from the closed position to an open position and expose an interior volume of a cavity of the base; and wherein the spring tab is a molded in, integral part of the base and projects from an exterior of a back portion of the base.

The step of pushing a button preferably includes pushing a button hingedly attached along a front portion of the base to release a hook and catch arrangement between the button and the lid.

In examples, the base comprises a front wall, opposite back wall, and first and second opposing sidewalls extending between the front wall and back wall; the front wall defining the front portion of the base; the back wall defining the back portion of the base; and the spring tab includes an arm arrangement securing the tab to the base and positioning the tab to be laterally spaced from the back wall; wherein the step pushing a button includes pushing the button to pivot the button from the front wall.

In example methods, the step pushing a button includes releasing a hook secured to the button from a catch secured to the lid.

A variety of examples of desirable features or methods are set forth in part in the description that follows, and in part will be apparent from the description, or may be learned by practicing various aspects of the disclosure. The aspects of the disclosure may relate to individual features as well as combinations of features. It is to be understood that both the foregoing general description and the following detailed description are explanatory only, and are not restrictive of the claimed invention.

DETAILED DESCRIPTION

Figure 1:
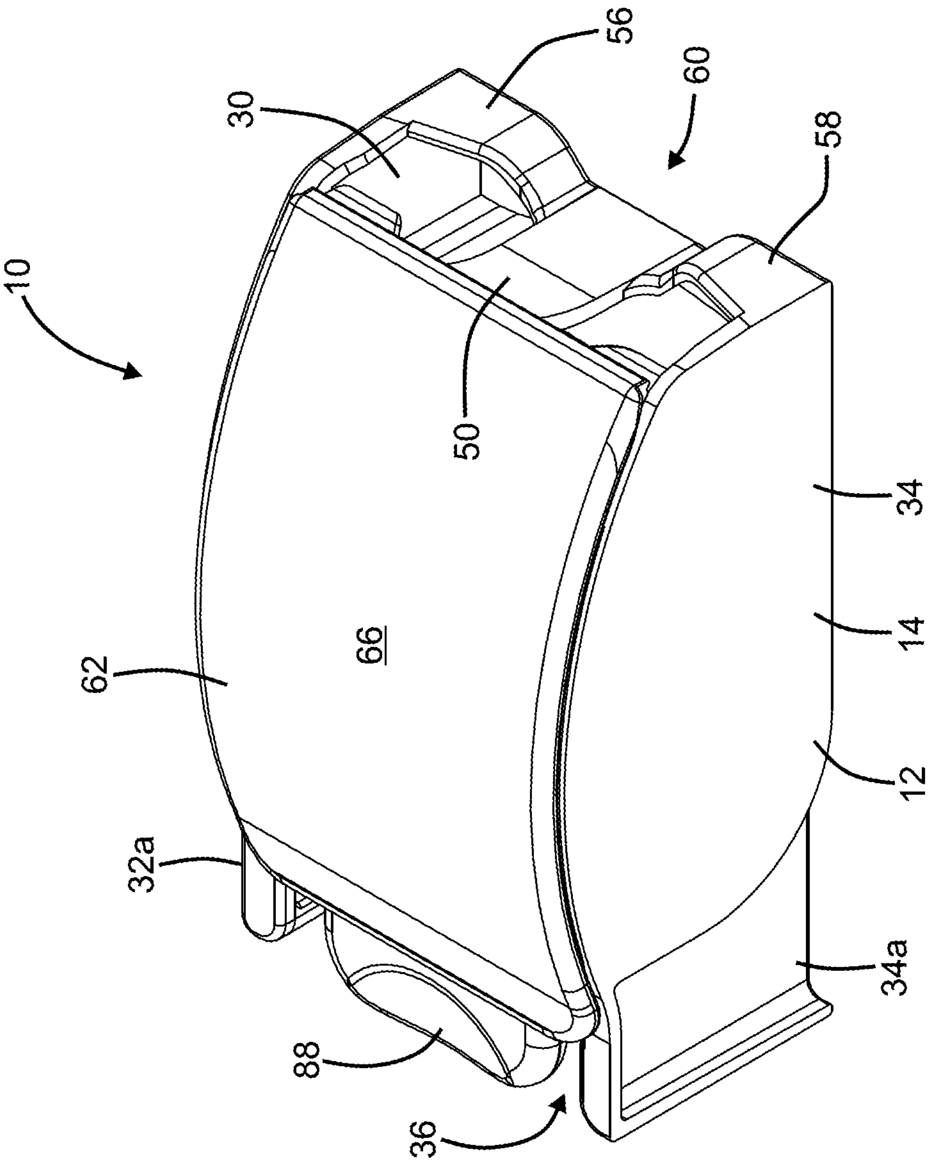
FIG. 1 is a top perspective view of an embodiment of a pill container in the closed position.

Referring now to FIGS. 1-9, a pill container is shown in general at 10. The container 10 can be used for the convenient storage of a variety of materials, including pills, medicines, vitamins, and the like. The container 10 can also be used to store any other small items such as buttons, screws, fasteners, sequins, or other various materials.

The container 10 includes a base 12. The base 12 has a surrounding wall 14 which defines a cavity 16 with an interior volume 18. The cavity 16 is for holding the contents of the container 10.

Figure 2:
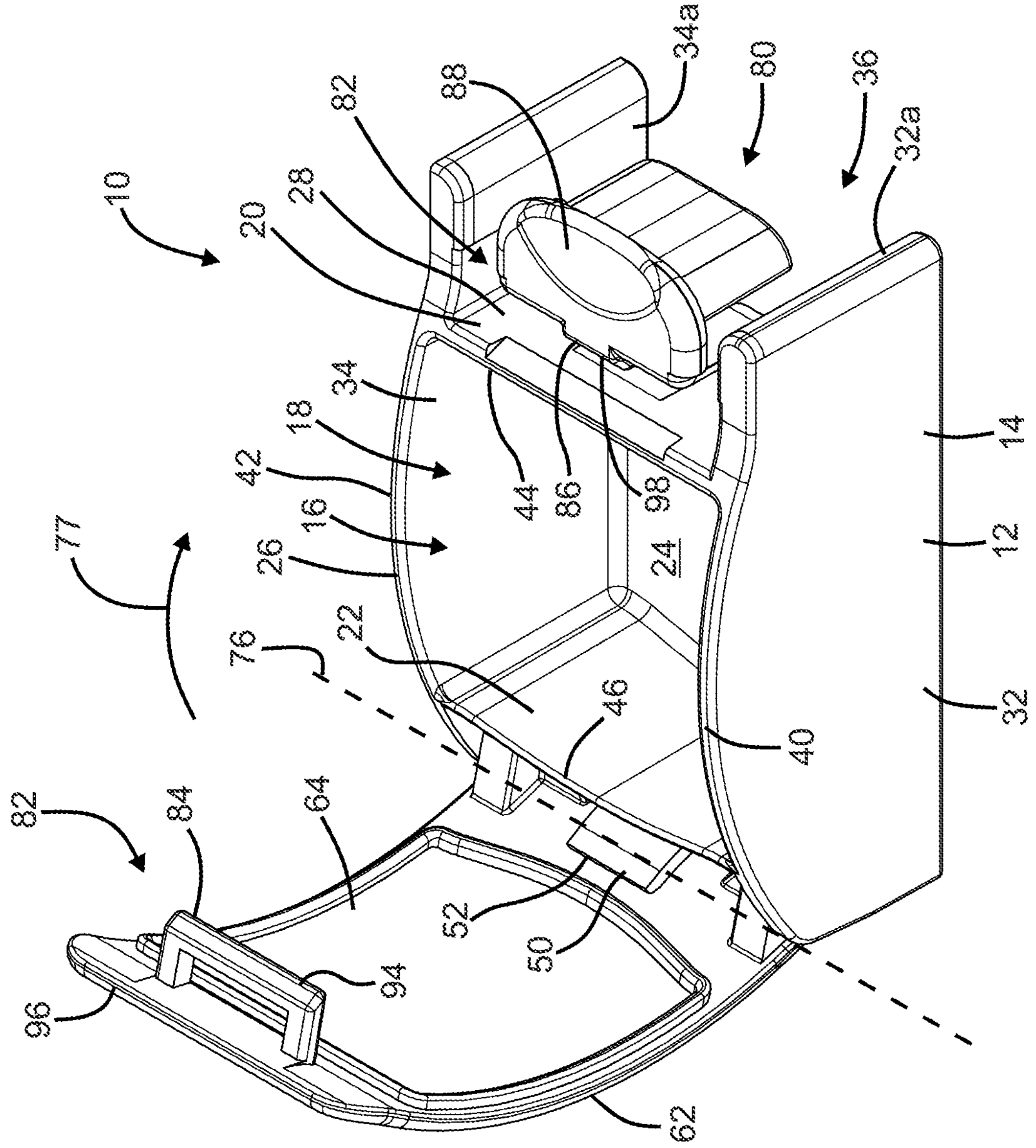
FIG. 2 is the pill container of FIG. 1 but showing the lid in an open position.
Figure 3:
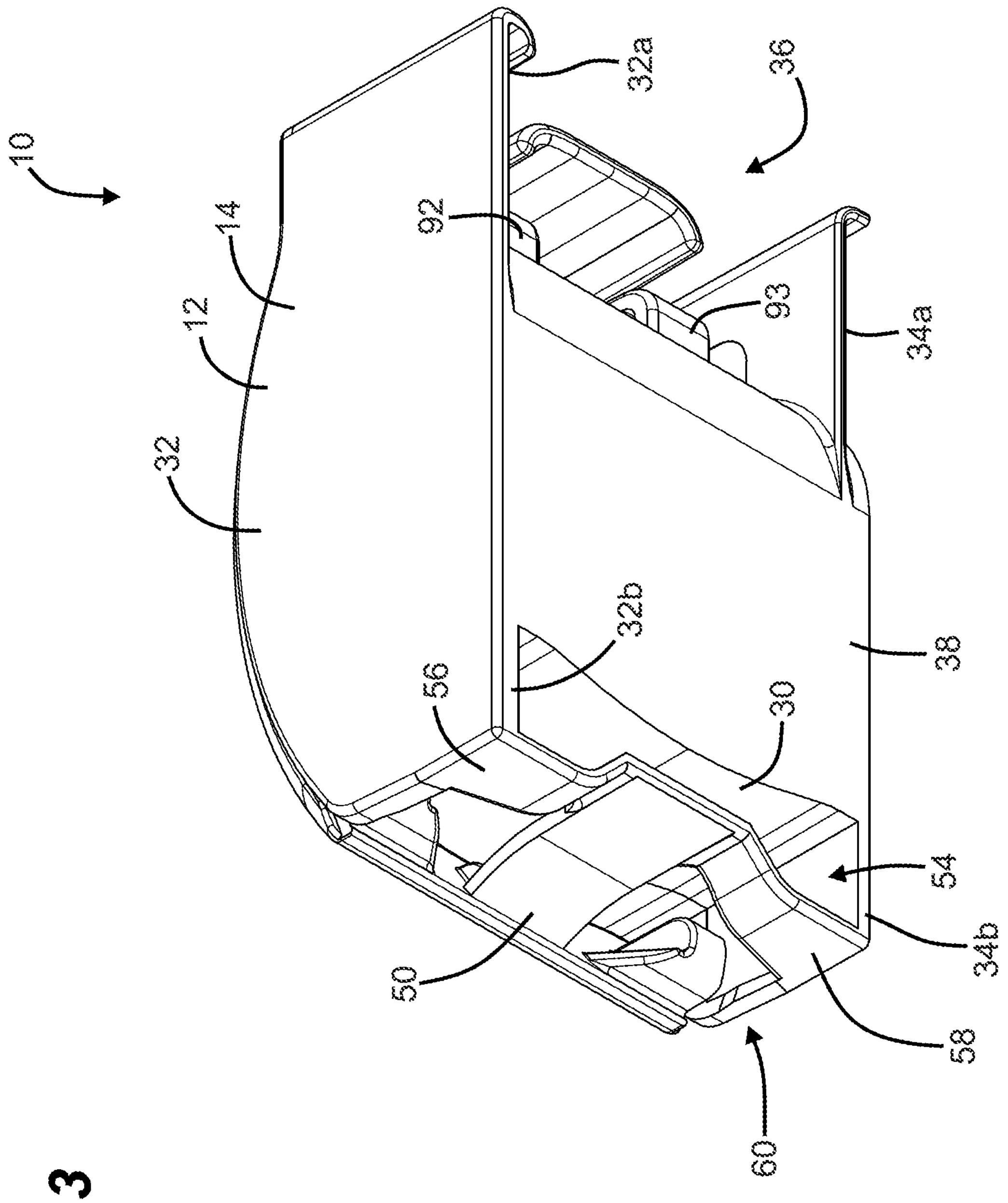
FIG. 3 is a bottom perspective view of the pill container of FIG. 1.

In reference to FIG. 2, the cavity 16 includes a front portion 20, an opposite back portion 22, a bottom 24, and an open mouth 26 opposite of the bottom 24. The open mouth 26 provides access to the interior volume 18 of the cavity 16.

Figure 7:
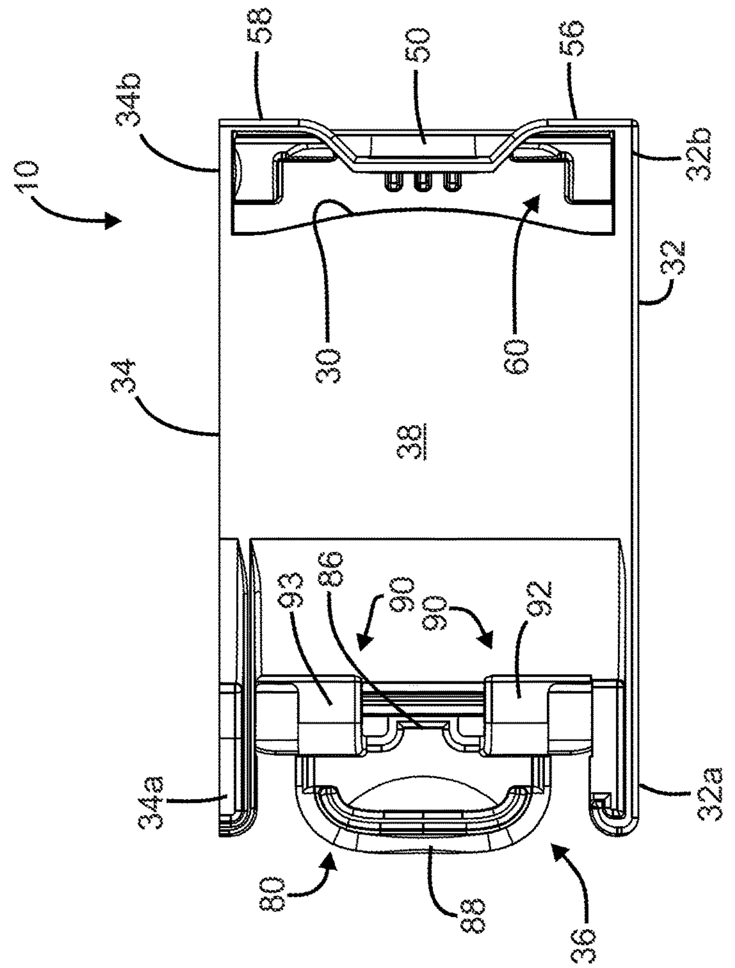
FIG. 7 is a bottom plan view of the pill container of FIG. 1.
Figure 6:
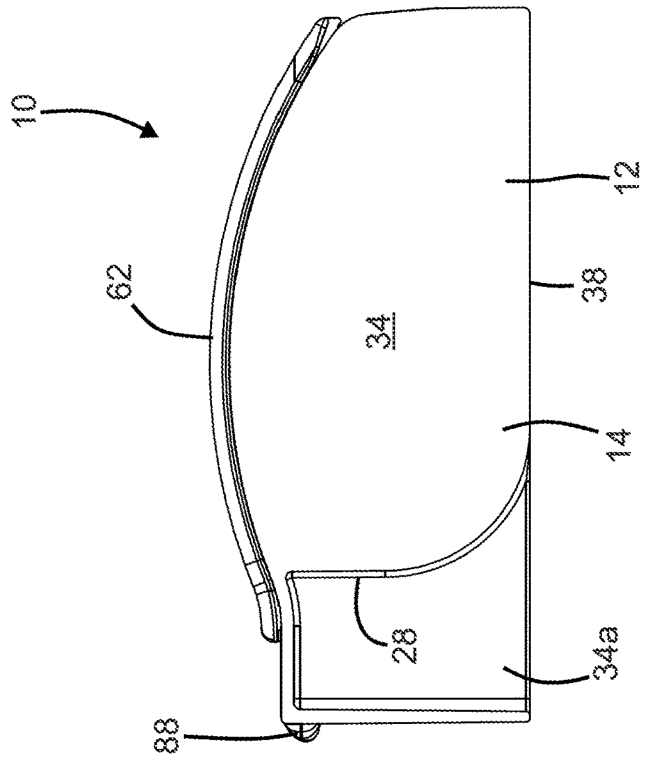
FIG. 6 is a side view of the pill container of FIG. 1.
Figure 8:
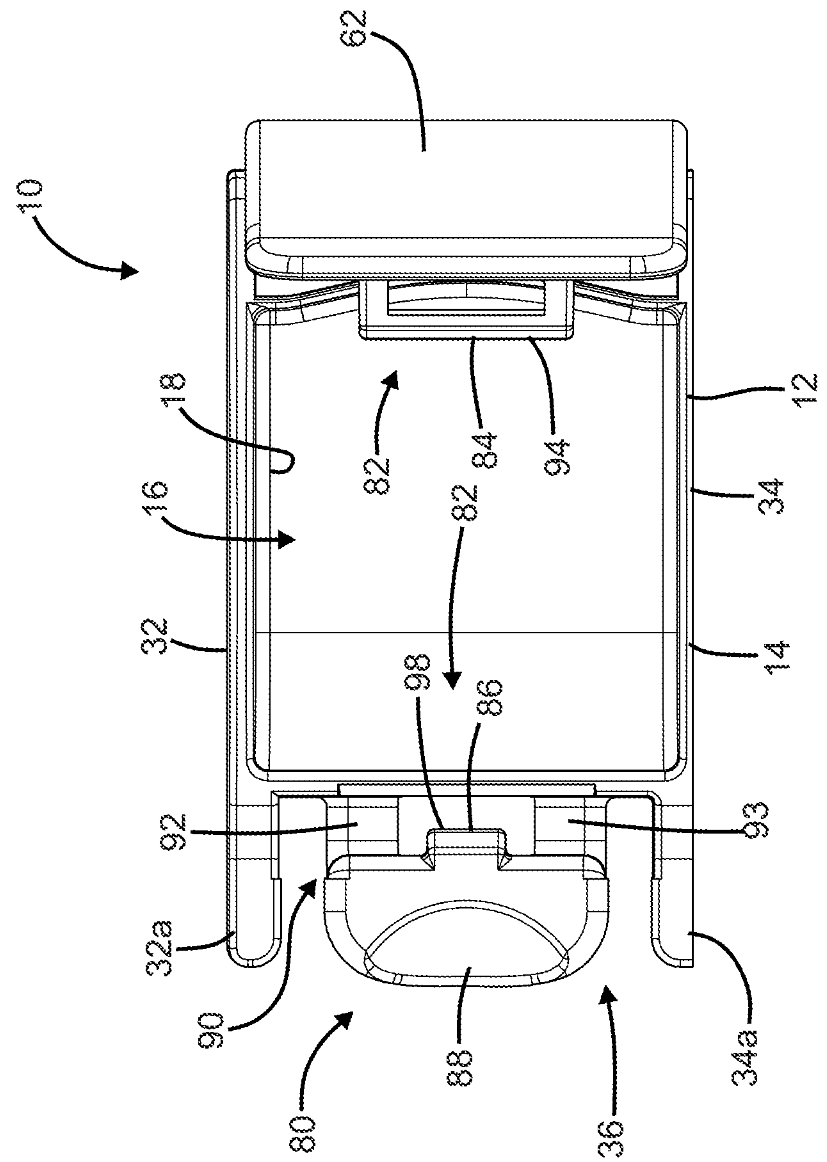
FIG. 8 is a top plan view of the pill container of FIG. 2, the lid being in an open position.

While many different configurations are possible, in the example shown, the surrounding wall 14, in this embodiment, includes a front wall 28, an opposite back wall 30, a first side wall 32, and a second side wall 34 opposing the first side wall 32. The first and second side walls 32, 34 extend between the front wall 28 and back wall 30. In FIGS. 2 and 7, it can be seen how the first and second side walls 32, 34 have extensions 32*a*, 34*a* which extend beyond the front wall 28. The region between the front wall 28 and these extensions 32*a*, 34*a* of the first side wall 32 and second side wall 34 define an inset or pocket 36.

In general, the portion of the front wall 28 which is in communication with the interior volume 18 forms the front portion 20 of the cavity 16. Similarly, the portion of the back wall 30 which is in communication with the interior volume 18 forms the back portion 22.

The first and second side walls 32, 34 are depicted as being straight along the area forming the bottom 38 (FIG. 7) of the container 10. This allows the container 10 to be stable when placed on a flat surface. The first and second side wall 32, 34 have along their sides that are opposite of the bottom 38 an upper rim 40, 42. Similarly, the front wall 28 and back wall 30 have upper rims 44, 46. The upper rims 40, 42, 44, 46 form the perimeter of the open mouth 26 of the cavity 16.

The upper rims 40, 42 of the first and second side walls 32, 34 can be shaped to be esthetically pleasing. For example, in the embodiment shown, the upper rims, 40, 42 are curved.

In accordance with principles of this disclosure, the base 12 further includes an integral spring tab 50. By "integral", it is meant that it is made as a single part with the base. While various techniques are contemplated, in the preferred embodiment, the spring tab 50 is molded in with the base 12, in contrast to being an inserted component.

Figure 4:
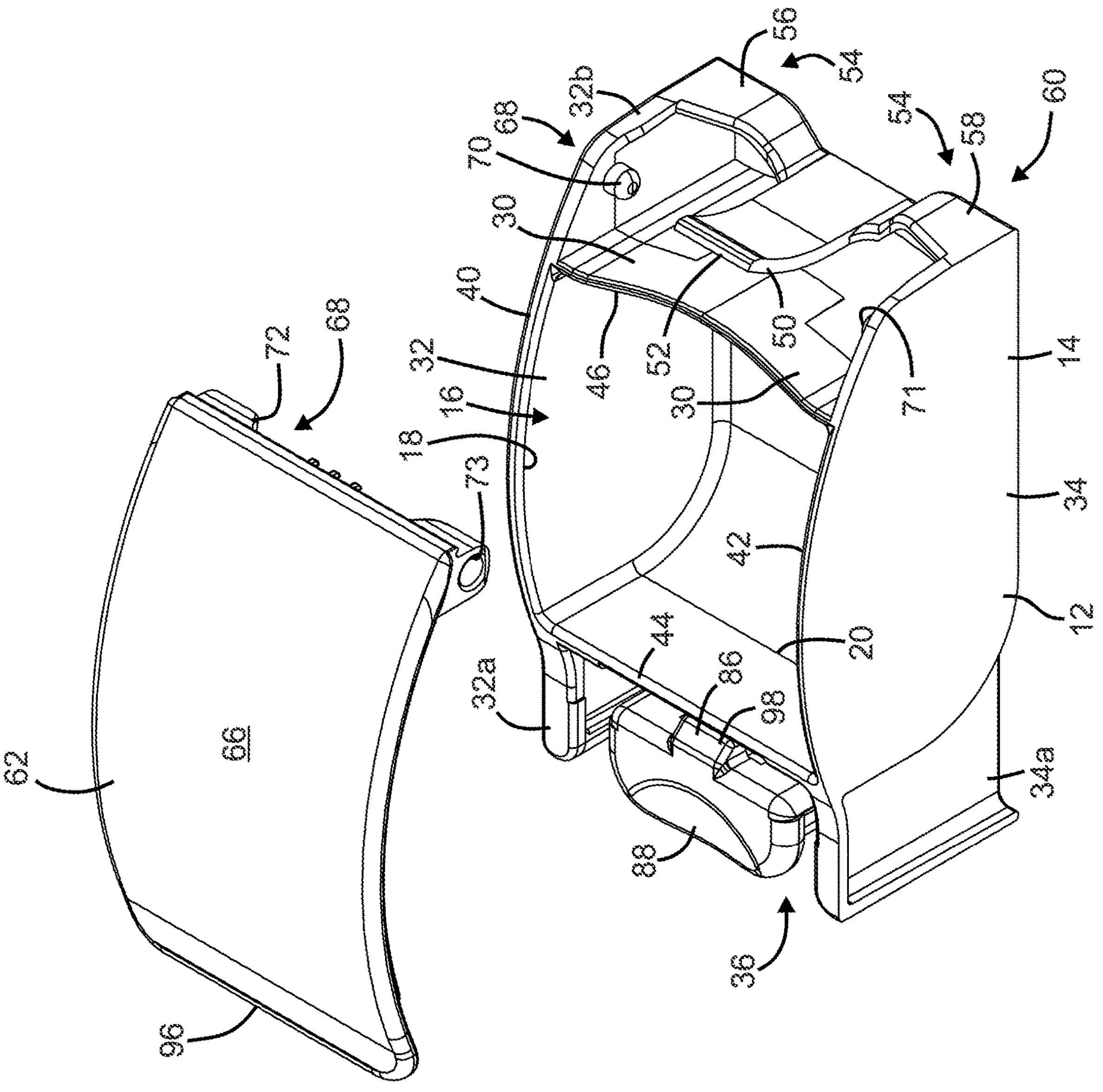
FIG. 4 is an exploded top perspective view of the pill container of FIG. 1.
Figure 5:
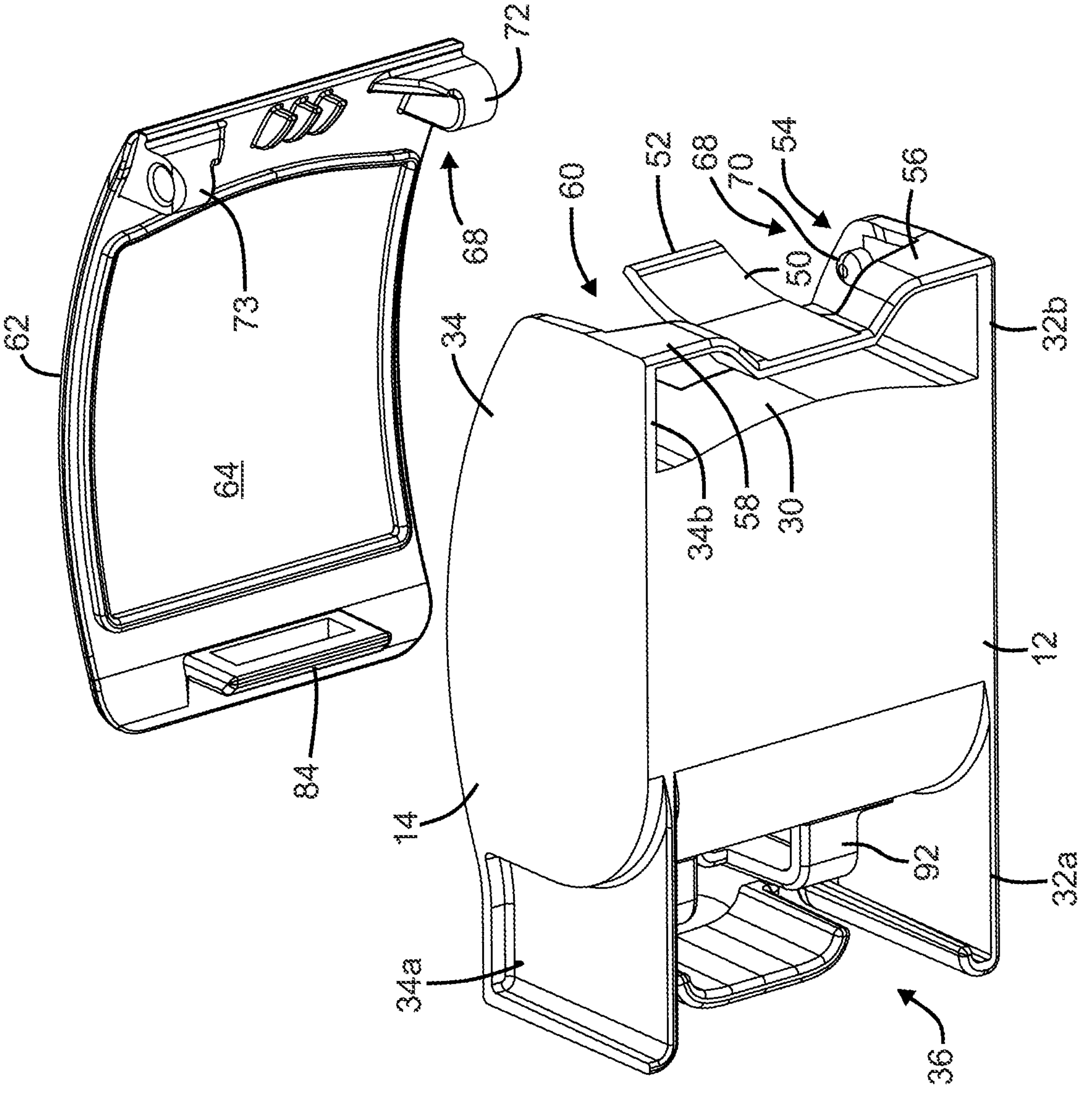
FIG. 5 is a bottom exploded perspective view of the pill container of FIG. 1.

The spring tab 50 can be seen in FIGS. 2, 4, and 5 as projecting from an exterior of the back portion 22 of the base 12. The spring tab 50 is resilient, meaning, that it will deform from force placed on it, but return back to its undeformed state when the force is removed. The purpose of the spring tab 50 is described further below.

The spring tab 50 includes a free end 52 that extends above the mouth 26 of the cavity 16. That is, the free end 52 projects or extends farther from the bottom 24 of the cavity 16 than the upper rim 46 of the back wall 30.

Attention is directed to FIG. 4. While many different embodiments are possible, in the one shown, the spring tab 50 includes an arm arrangement 54. The arm arrangement 54 secures the spring tab 50 to the base 12 and positions the spring tab 50 to be laterally spaced from the back wall 30.

The arm arrangement 54 includes a first arm 56 extending from the first side wall 32 to the tab 50, and a second arm 58 extending from the second side wall 34 to the tab 50. The first and second side walls 32, 34 extend beyond the back wall 30 with extensions 32*b*, 34*b* to form a rear pocket 60. The spring tab 50 and arm arrangement 54 are positioned within the rear pocket 60. The first arm 56 and second arm 58 are attached to the tab 50 along the lower half of the tab 50, closer to the bottom 38. The remaining portion of the spring tab 50 is free and unattached, ending with the free end 52. The free end 52 is taller than the upper rim 46 of the back wall 30.

In preferred arrangements, the base 12, spring tab 50, and arm arrangement 54 are part of a single-molded material. This leads to advantages. For example, when the spring tab 50 and arm arrangement 54 is part of the same molded piece as the remaining part the base 12, there are no pieces that may become loose or unattached. Pieces that can become loose or unattached could fall into the cavity 16 and be accidentally consumed by a user, believing it to be a pill.

In accordance with principles of this disclosure, the container 10 further includes a lid 62. The lid 62 is sized to removably cover the cavity 16 over the mouth 26 so that the lid 62 is movable between a closed position cover the cavity 16 (FIG. 1) and an open positon (FIG. 2) exposing the cavity 16. The lid 62 has an interior surface 64, which faces the cavity 16, when the lid 62 is in the closed position. The lid 62 has an opposite exterior surface 66, which always faces away from the cavity 16.

The lid 62 is secured to the back portion 22 of the base 12. While many examples are possible, in the one shown, the lid 62 is pivotably secured to the back portion 22 of the base 12.

While many embodiments are possible, in the one shown, the lid 62 and base 12 include a pivotable connection in the form of a projection/receiver arrangement 68. One of the base 12 and lid 62 can include a projection, while the other can have a receiver that receives the projection and allows the projection to pivot within it.

In the example shown, the base 12 includes a pair of projections, such as cylindrical bosses 70, 71. In this embodiment, the bosses 70, 71 are extending or projecting from the extensions of the first and second side walls 32*b*, 34*b* and into the rear pocket 60. The lid 62 has a pair of holders 72, 73 projecting form the interior surface 64 of the lid 62. Each of the holders 72, 73 has cylindrical openings or receivers. The bosses 70, 71 fit and are received within the receivers of the holders 72, 73. This allows the lid 62 to pivot about axis 76 (FIG. 2) and be positionable between the open position of FIG. 2, in which the lid 62 is away from the mouth 26, in a direction of arrow 77 to the closed position of FIG. 1, in which the lid 62 covers the mouth 26 and is against the upper rims 40, 42, 44, 46.

The lid 62 can be a variety of shapes. In the example shown in FIGS. 1-5, the lid 62 is curved, such that the interior surface 64 has a concave shape, while the exterior surface 66 has a convex shape. This shape provides both for an increase in the interior volume 18 within the cavity 16, as well as contributing to giving the container 10 an attractive appearance.

The lid 62 is positioned relative to the base 12 such that the spring tab 50 is in pushing engagement against the interior surface 64 of the lid 62, when the lid 62 is in the closed position. This positioning of the spring tab 50 relative to the interior surface 64 of the lid 62 helps to propel or push the lid 62 into the open position, when the lid 62 is unlocked from the base 12.

In accordance with principles of this disclosure, the container 10 further includes a push button assembly 80. The push button assembly 80 is connected to the base 12 and is provided to engage the lid 62 to either lock it in the closed position or unlock it to allow the lid 62 to move to the open position.

The lid 62 and the push button assembly 80 include a hook and catch arrangement 82. The lid 62 includes a first member 84 of the hook and catch arrangement 82, while the push button assembly 80 has a second member 86 of the hook and catch arrangement 82. The hook and catch arrangement 82 allows for selective locking of the lid 62 to the base 12, and selective unlocking of the lid 62 from the base 12. When the lid 62 is unlocked from the base 12, the spring tab 50 pushes against the interior surface 64 of the lid 62 to move the lid 62 from the closed position to the open position.

The push button assembly 80 is preferably integral with the base 12. That is, in preferred embodiments, the push button assembly 80 is a single molded material with a remaining portion of the base 12. In many preferred embodiments, the base 12, spring tab 50, arm arrangement 54, and push button assembly 80 are all a part of a single molded member. This leads to advantages, in that pieces cannot easily come apart and mistakenly end up in the cavity 16, which might be confused by the user as a medicinal pill.

In the embodiment shown, the push button assembly 80 is positioned along the front portion 20 of the base 12. In the example shown in FIG. 2, the push button assembly 80 is within the front pocket 36, located between the extensions of first and second side walls **32*a*, 34*a* and the front wall 28 outside of the cavity 16**.

The push button assembly 80 can include a button 88 sized for engagement of the tip of a human finger, such as an index finger. The button 88 is spaced between and from the inside surfaces of the first and second side walls **32*a*, 34*a* within the pocket 36**.

The push button assembly 80 further includes a hinge arrangement 90 joining the button 88 to the base 12 to provide a pivotable attachment of the button 88 to the base 12. In the example shown in FIGS. 7-9, the hinge arrangement 90 includes a pair of spring legs 92, 93 projecting from the front wall 28 into the pocket 36 and to the button 88.

Figure 9:
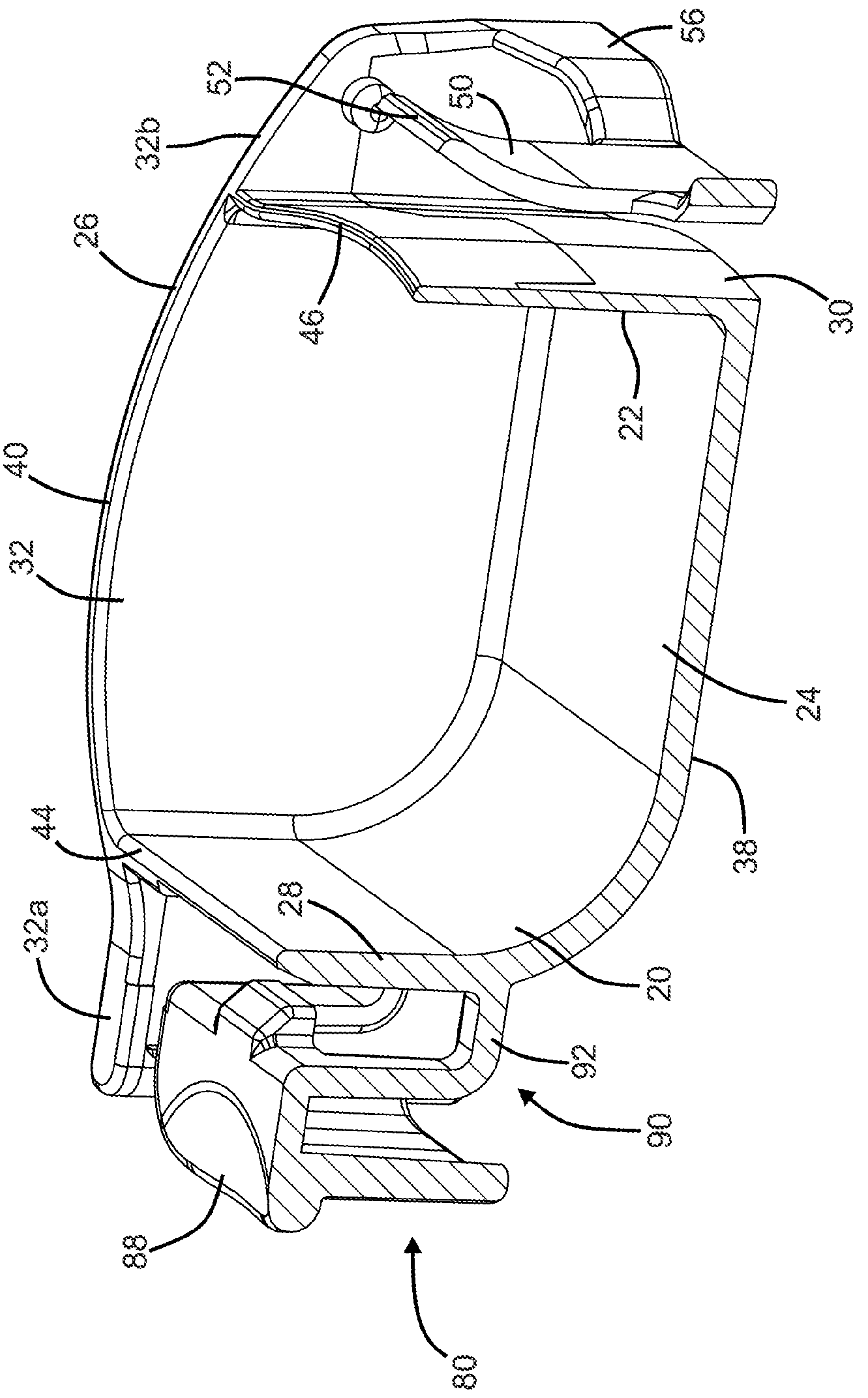
FIG. 9 is a cross-sectional view of a base of the pill container, without the lid.

FIG. 9 shows a cross-sectional view, in which one of the legs 92 can be seen. The leg 92 is generally u-shaped, as it extends from the button 88 to the front wall 28.

The push button assembly 80 further includes the second member 86 of the hook and catch arrangement 82. The second member 86 projects from the button 88 to be positioned between the button 88 and the base 12, in this case, the front wall 28 of the base 12.

The hook and catch arrangement 82 includes a hook and a catch. The hook and catch can be on either the lid 62 or the push button assembly 80. In the particular example shown, the first member 84 of the hook and catch arrangement 82 is a catch 94 projecting from the interior surface 64 and adjacent the free end 96 of the lid 62. The second member 86 of the hook and catch arrangement 82 is a hook 98 projecting from the button 88 toward the base 12.

When the lid 62 is in the closed position of FIG. 1, the hook 98 is located within the catch 94 of the lid 62 to lock or hold the lid 62 in place. When the button 88 is pressed in a direction toward the bottom 38, the button 88 pivots about the hinge arrangement 90 due to the flexing of the legs 92, 93. This moves the hook 98 away from the front wall 28 of the base 12 and out of engagement with the catch 94 to unlock the lid 62 from the base 12. When the lid 62 is unlocked from the base 12, the spring tab 50 pushes against the interior surface 64 of the lid 62 to pop up or move the lid 62 from the closed position to the open position.

In preferred implementations, the base 12 is made from a molded plastic material, and all of the base 12, spring tab 50, arm arrangement 54, and push button assembly 80 are part of the single molded material. There are no extra pieces that may become unattached.

Figure 10:
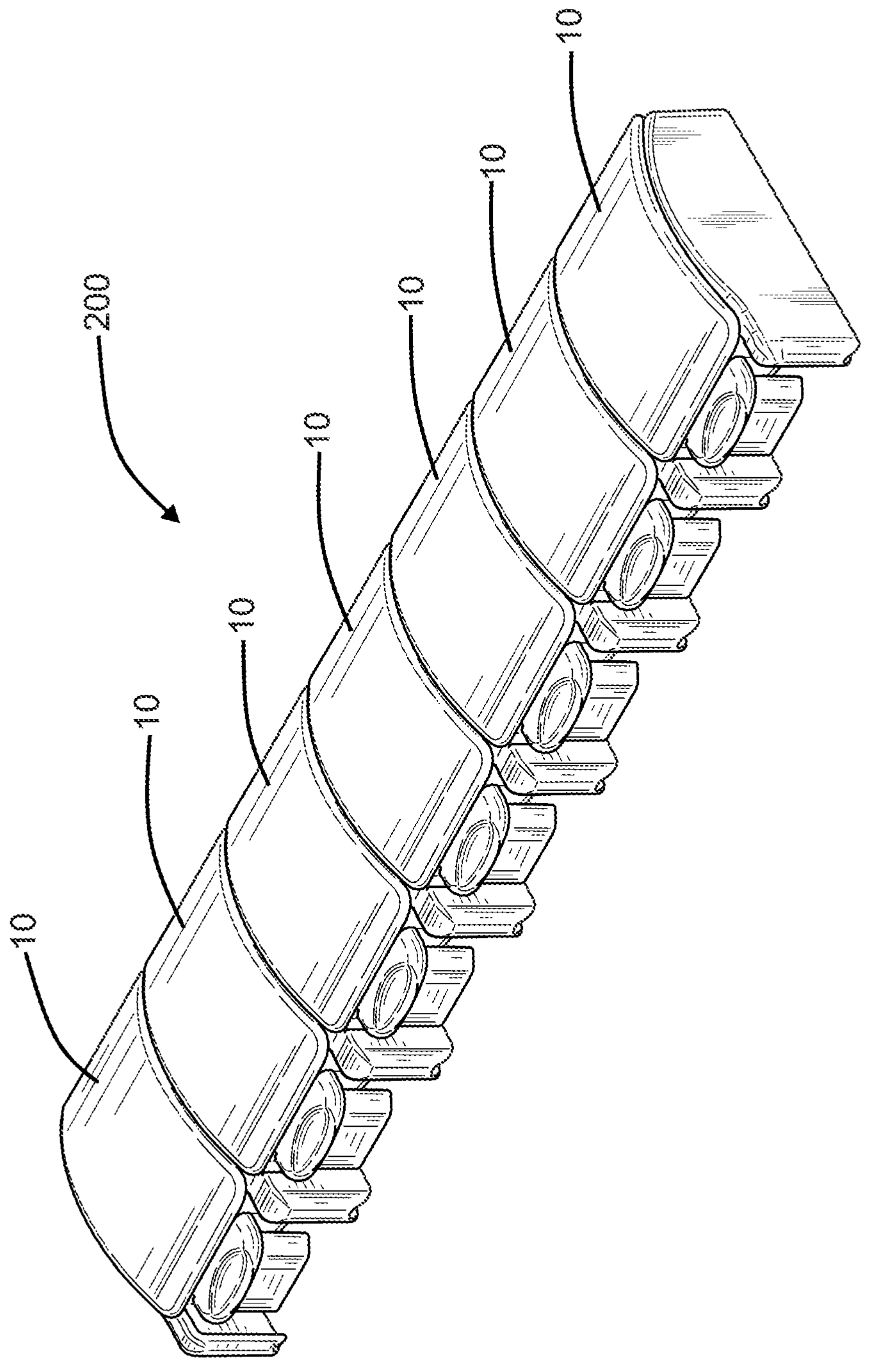
FIG. 10 is a perspective view of the pill container of FIG. 1 used in a 7 compartment pill planner container.

The container 10 can be incorporated into a pill container having several compartments or containers 10 arranged side-by-side in a row. For example, the container 10 can be part of a pill planner 200 (FIG. 10) having at least seven containers 10, side-by-side, wherein each of the containers 10 within the pill planner 200 can be used for one of the days of the week.

Figure 11:
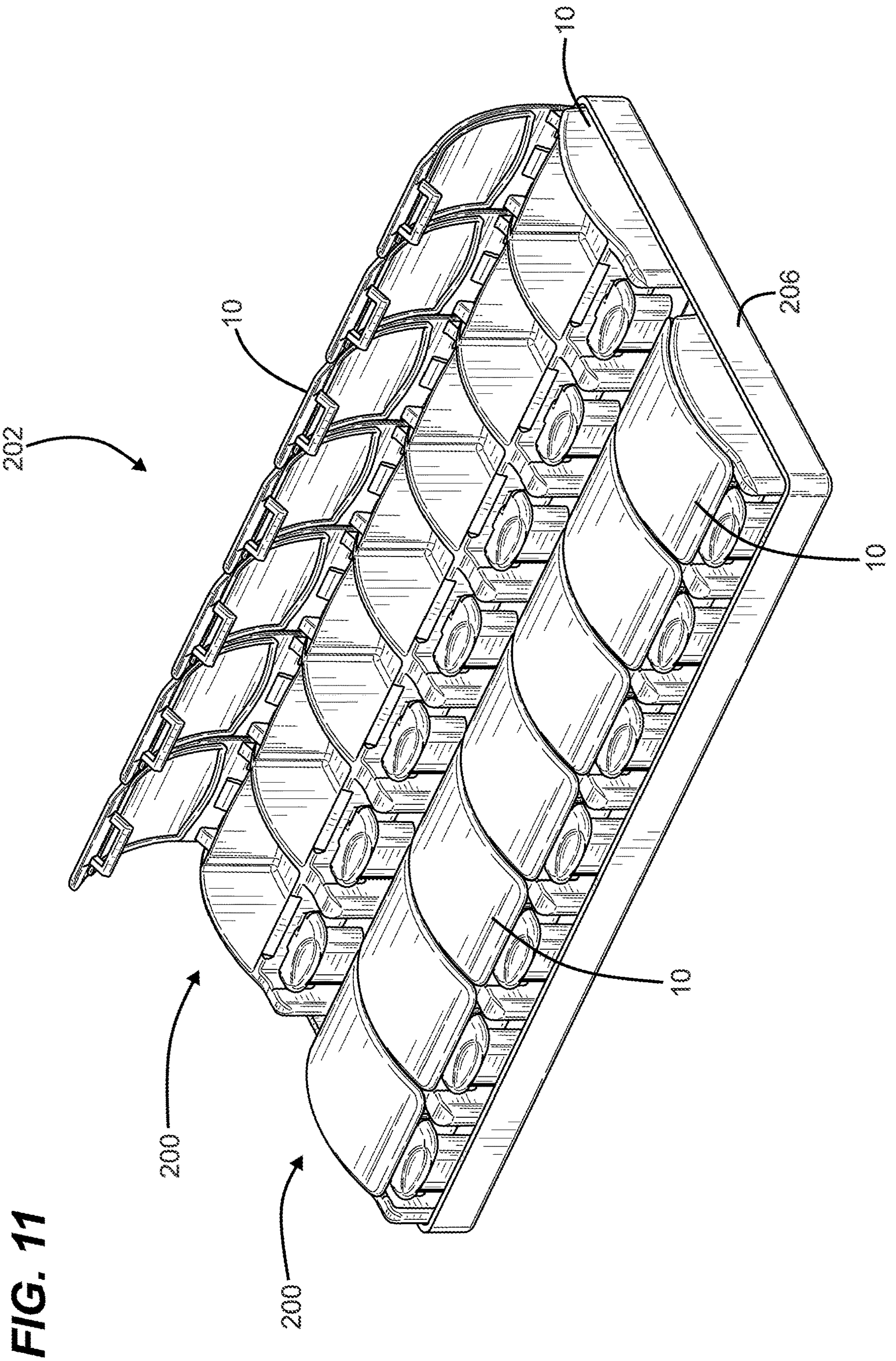
FIG. 11 is a perspective view of the pill container of FIG. 1 used in a 14 compartment pill planner container.

FIG. 11 shows a pill planner 202 having 14 total containers 10, arranged 7 side-by-side and in two rows. The pill planner 202 could be used, for example, as a two week pill planner. In this embodiment, the pill planner 202 includes two rows of 7 day pill planners 200 removably fixed in a bottom tray 206.

Figure 12:
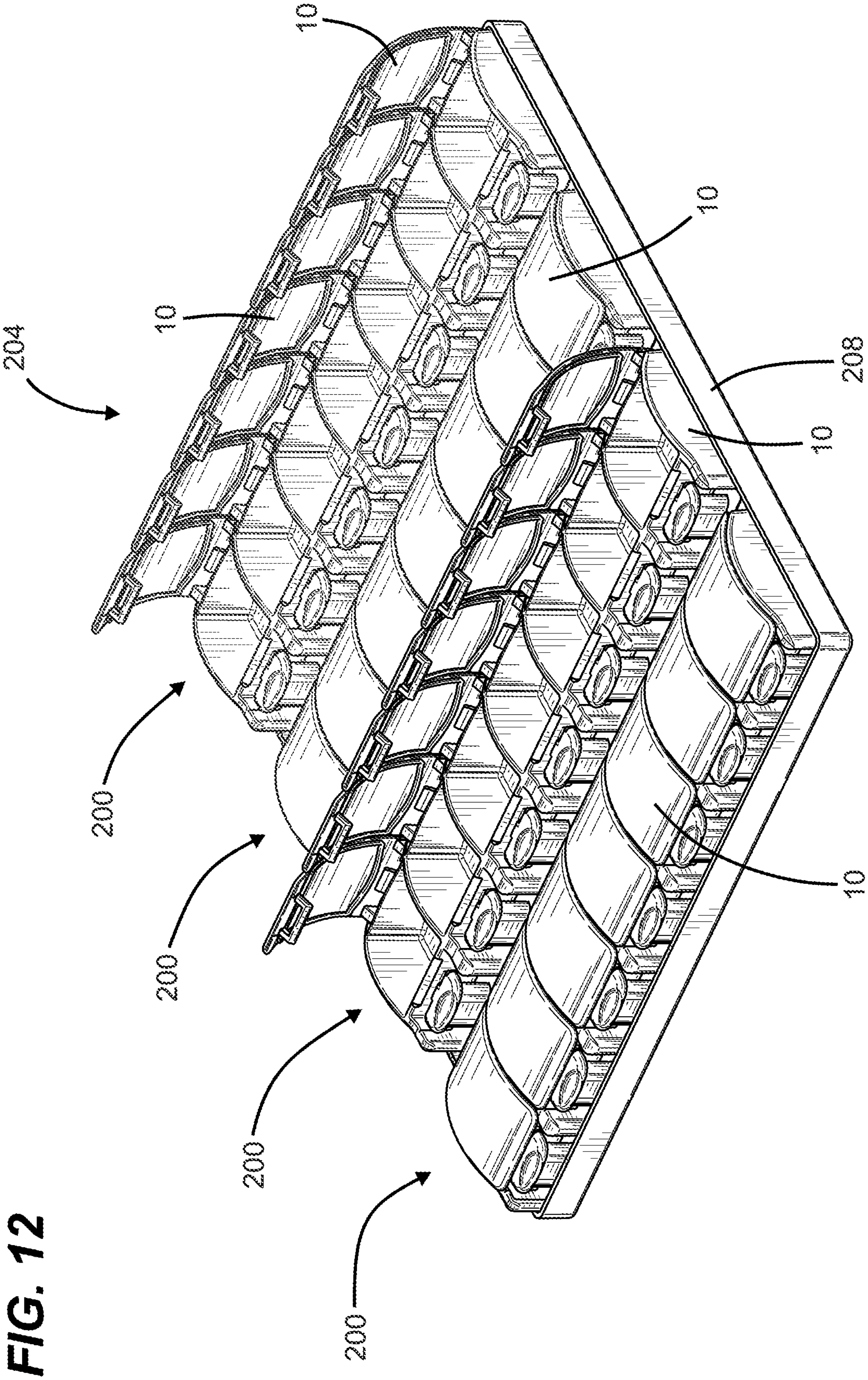
FIG. 12 is a perspective view of the pill container of FIG. 1 used in a 28 compartment pill planner container.

FIG. 12 shows a pill planner 204 having 28 total containers 10, arranged 7 side-by-side and in four rows. The pill planner 204 could be used, for example, as a four week/1 month pill planner. In this embodiment, the pill planner 204 includes four rows of 7 day pill planners 200 removably fixed in a bottom tray 208.

The container 10 can be used as part of a method. A method of opening the container 10 includes pushing the button 88 to unlock the lid 62 from the base 12 and allowing the spring tab 50 to push against the interior surface 64 of the lid 62 to move the lid 62 from the closed position to an open position and expose the interior volume 18 of the cavity 16 of the base 12. The spring tab 50 is a molded in, integral part of the base 12 and projects from the exterior of the back portion 22 of the base 12.

The step of pushing the button 88 includes the button 88 being hingedly attached along the front portion 20 of the base 12 to release the hook and catch arrangement 82 between the button 88 and the lid 62.

The step of pushing the button 88 includes pushing the button 88 to pivot the button 88 in a direction away from the front wall 28 of the base 12.

The step of pushing the button 88 includes releasing the hook 98 secured to the button 88 from the catch 94 secured to the lid 62.

The method can also include closing the container 10, by pushing the lid 62 against the force of the spring tab 50 to engage the hook and catch arrangement 82 between the lid 62 and the push button assembly 80 to lock the lid 62 in place covering the cavity 16.

The above represents example principles. Many embodiments can be made using these principles.

What is claimed is:

1. A container comprising:

(a) a base having surrounding wall defining a cavity with an interior volume;

(i) the cavity including a front portion, a back portion, a bottom, and an open mouth opposite of the bottom; the open mouth providing access to the interior volume of the cavity;

(ii) the base having a molded in, integral spring tab projecting from an exterior of the back portion;

(iii) the surrounding wall including a front wall, opposite back wall, and first and second opposing sidewalls extending between the front wall and back wall; the front wall defining the front portion of the cavity; the back wall defining the back portion of the cavity;

(A) the spring tab including an arm arrangement integrally molded to the base and positioning the tab to be laterally spaced from the back wall;

(b) a lid being sized to removably cover the cavity over the mouth so that the lid is movable between a closed position covering the cavity and an open position exposing the cavity; the lid having an interior surface facing the cavity;

(i) the lid being pivotably secured to the back portion of the base;

(ii) the spring tab being in pushing engagement directly against the interior surface of the lid, when the lid is in the closed position; and (iii) the lid having a first member of a hook and catch arrangement to selectively lock the lid to the base, when the lid is in the closed position, and selectively unlock the lid from the base; and (c) a push button assembly connected to the base having a second member of the hook and catch arrangement to selectively lock the lid to the base, when the lid is in the closed position, and selectively unlock the lid from the base;

wherein when the lid is unlocked from the base, the spring tab makes direct contact with and pushes against the interior surface of the lid to move the lid from the closed position to the open position.

2. The container of claim 1 wherein the push button assembly is positioned along the front portion of the base.

3. The container of claim 1 wherein the push button assembly is integral with the base.

4. The container of claim 1 wherein the push button assembly comprises:

(a) a button sized for engagement of a human finger;

(b) a hinge arrangement joining the button to the base to provide a pivotable attachment of the button to the base; and (c) the second member of the hook and catch arrangement projecting from the button, between the button and the base.

5. The container of claim 4 wherein:

(a) the first member of the hook and catch arrangement is a catch projecting from a free end of the lid; and (b) the second member of the hook and catch arrangement is a hook projecting from the button toward the base.

6. The container of claim 1 wherein the spring tab has a free end extending above the mouth of the cavity.

7. The container of claim 1 wherein the base, spring tab, and arm arrangement are a single molded material.

8. The container of claim 1 wherein the base, spring tab, arm arrangement, and push button assembly are a single molded material.

9. The container of claim 1 wherein the lid is concave along the interior surface.

10. The container of claim 1 wherein the spring tab has a free end that is free of attachment to the lid.

11. The container of claim 10 wherein the free end extends above the mouth of the cavity.

12. The container of claim 1 wherein the arm arrangement is adjacent to the bottom of the cavity such that the tab extends from the arm arrangement adjacent to the bottom of the cavity and extends along a region adjacent to the back wall.

* * * * *